United States Patent [19]

Hopkins et al.

[11] Patent Number: 5,849,075
[45] Date of Patent: Dec. 15, 1998

[54] CEMENTITIOUS COMPOSITION CONTAINING BOTTOM ASH AS POZZOLAN AND CONCRETES AND MORTARS THEREFROM

[75] Inventors: Donald Stephen Hopkins, Thornhill; David Bridson Oates, Kettleby, both of Canada

[73] Assignee: Lafarge Canada Inc., Canada

[21] Appl. No.: 794,208

[22] Filed: Jan. 30, 1997

Related U.S. Application Data

[63] Continuation of Ser. No. 531,792, Sep. 21, 1995, abandoned.
[51] Int. Cl.$^6$ ............................ C04B 14/00; C04B 14/04; C04B 18/04
[52] U.S. Cl. ......................... 106/705; 106/697; 106/737; 106/816; 106/819
[58] Field of Search ................................. 106/697, 705, 106/707, 737, 738, 816, DIG. 1, 819

[56] References Cited

U.S. PATENT DOCUMENTS

| | | | |
|---|---|---|---|
| 4,040,852 | 8/1977 | Jones | 106/705 |
| 4,880,468 | 11/1989 | Bowlin et al. | 106/DIG. 1 |
| 5,199,377 | 4/1993 | Gehrmann, III et al. | 119/4 |
| 5,250,113 | 10/1993 | Berke et al. | 106/737 |

FOREIGN PATENT DOCUMENTS 61-21940 1/1986 Japan .

OTHER PUBLICATIONS

Design and Control of Concrete Mixtures, Sixth Canadian Edition, Canadian Portland Cement Association, pp. 17, 18, 24 and 25 (Date unknown).

CAN/CSA–A23.5–M86, Supplementary Cementing Materials (1992) (no month).

Kohno & Komatsu "Use of Ground Bottom Ash and Silica Fume in Mortar and Concrete", in Fly Ash, Silica Fume, Slag and Natural Pozzolans in Concrete, (Ed. V.N. Malhotra), ACI SP 91, vol. 2, American Concrete Institute, Detroit, 1986, pp. 1279–1292 (no month).

Delvasto, "Pozzolanic Activity and Characteristics of Columbian Materials", ibid., vol. 2, pp. 77–89 (Date unknown).

Ducreux et al., "The effects of fineness on the pozzolanic behavior of fly ashes as additions to cement", Chemical Abs., 52, 7705e, entitled concrete and cement products. 1963 (no month).

*Primary Examiner*—Michael Marcheschi
*Attorney, Agent, or Firm*—Bachman & LaPointe, P.C.

[57] ABSTRACT

Ground bottom ash, a waste material derived from combustion of coal, which presents a disposal problem, replaces part of the cement in a cementitious material useful in concretes and mortars and provides compressive strengths in concretes comparable with or better than corresponding cements in which there is no replacement of cement by ground bottom ash and cements containing fly ash.

17 Claims, No Drawings

CEMENTITIOUS COMPOSITION CONTAINING BOTTOM ASH AS POZZOLAN AND CONCRETES AND MORTARS THEREFROM

This is a Continuation of application Ser. No. 08/531,792, filed Sep. 21, 1995 now abandoned.

BACKGROUND OF THE INVENTION i) Field of the Invention

This invention relates to cement and concrete and mortar compositions in which part of the cement is replaced by ground bottom ash.

ii) Description of Prior Art

Coal ash is the residual mineral produced when coal is burnt in electrical power generating stations; the portion that agglomerates in the coal combustion boiler is known as bottom ash because it is recovered from the base of the boiler; the portion that does not agglomerate in the boiler is known as fly ash and may be recovered from the flue gases from the boiler.

In general the fly ash comprises about 80% by weight of the coal ash and the bottom ash comprises about 20%, by weight.

In a wet bottom boiler, sometimes referred to as a cyclone boiler, in which coal is burnt, the bottom ash is molten and is quenched in water at the base of the boiler. In a dry bottom boiler in which the coal is burnt, the bottom ash is not fully molten, but is in the form of soft, partially molten particles which agglomerate in the hot gases of the boiler, for example, during impact with inclined walls of the boiler. The partially molten or plastic agglomerates are poured into a channel where they are quenched with water.

Fly ash is a fine particulate material and is a recognized pozzolan used as a partial replacement for cement in concrete.

Bottom ash is essentially a waste material having a particle size typically ranging from that of sand to that of gravel, and has found limited application as mineral aggregate in construction, for example, in road bases.

Japanese Patent Kokai 61-21940 of Shimizu Kensetsu K.K. describes mortar compositions containing bottom ash as a replacement for sand, in which the wide range of particle size of the particles of the bottom ash is employed with advantage to overcome problems arising from the use of sand having a more uniform particle size.

SUMMARY OF THE INVENTION

It is an object of this invention to provide a cementitious composition which advantageously employs ground bottom ash.

It is a further object of this invention to provide a concrete or mortar composition employing the cementitious composition of the invention.

It is a still further object of the invention to provide, as a new substance, a ground bottom ash.

In accordance with one aspect of the invention there is provided a cementitious composition comprising 75 to 85%, by weight, cement and 15 to 25%, by weight, of a pozzolanic material having as at least a major component, a ground bottom ash having a particle size less than 50 $\mu$m size such that 80 to 100% pass a 45 $\mu$m screen.

In accordance with another aspect of the invention there is provided a concrete or mortar composition comprising:

i) a cementitious composition of the invention, ii) mineral aggregate, and iii) water, the concrete or mortar composition having a water/cementitious composition ratio of 0.25:1 to 0.7:1.

It will be understood that the character of the composition as a concrete or mortar will depend on the nature of the aggregate; when the aggregate includes coarse aggregate the composition is a concrete; when the aggregate comprises fine aggregate, the composition is a mortar.

DESCRIPTION OF PREFERRED EMBODIMENTS i) Bottom Ash

As indicated hereinbefore, bottom ash is formed as agglomerates in coal combustion boilers from the combustion of coal.

Such combustion boilers may be wet bottom boilers or dry bottom boilers.

When produced in a wet or dry bottom boiler, the bottom ash is quenched in water. The quenching results in agglomerates typically having a size in which 90% fall within the particle size range of 0.1 mm to 20 mm; in general the bottom ash agglomerates have a wide distribution of agglomerate size within this range.

It has now been found that the water quenching produces a highly amorphous, glass phase, in the agglomerates and that when the agglomerates are ground to a particle size in which 80 to 100% and preferably at least 85 to 90% pass a 45 $\mu$m screen, the resulting ground bottom ash is a highly active pozzolan.

The ground agglomerates may typically have a particle size of less than 50 $\mu$m.

When produced in a dry bottom boiler and ground to cement fineness, ground bottom ash is an effective pozzolan but marginally less than that of bottom ash from a wet bottom boiler.

Preferably the bottom ash is ground to a particle size of less than about 45 $\mu$m. There is no precise lower limit for the particle size, the cementitious characteristics improve as the particles are ground to finer particle size, however, finer particles sizes entail higher costs for grinding. In general the lower limit of the particle size might be of the order of 1–2 $\mu$m.

The main chemical components of a bottom ash are silica and alumina with lesser amounts of oxides of Fe, Ca, Mg, Mn, Na and K, as well as sulphur and carbon. The bottom ash may also have hydraulic properties; this depends on the chemistry of the coal, especially the calcium content.

It will be recognized that replacement of a portion of the cement employed in a cementitious composition by an otherwise waste material which presents a disposal problem, has significant economic advantages both in reducing the amount of expensive cement employed and in utilizing a waste material which is costly to dispose of.

Typically the cement may comprise 15 to 25% and preferably about 20%, by weight, of the ground bottom ash.

ii) Cementitious Composition

The cementitious composition of the invention comprises an inorganic, hydraulic cement more especially Portland cement, in association with a pozzolanic material of which the ground bottom ash is the major component.

The pozzolanic material may be composed solely of the bottom ash, however, it is found that the inclusion of a small amount of silica fume in admixture with the bottom ash, significantly enhances the benefits obtained from the use of bottom ash to replace part of the cement.

Suitably the cementitious composition comprises 75 to 85%, preferably about 80%, by weight, of cement and 15 to 25%, preferably 20%, by weight, of the pozzolanic material.

When the pozzolanic material comprises ground bottom ash and silica fume, it generally will contain 75 to 85%, preferably about 80%, by weight, of the ground bottom ash and 15 to 25, and preferably about 20%, by weight, of silica fume, based on the weight of the pozzolanic material.

Silica fume is a by-product formed in the production of silicon or ferro-silicon alloys and is collected by filtration of gases leaving the electric arc furnace. Typically it contains at least 75%, by weight, of silicon dioxide and consists of very fine spherical particles having an average diameter of about 0.1 $\mu$m.

In its dry particulate form it is sometimes referred to as dry silica fume, and if moistened or dampened with water it is sometimes referred to as wet silica fume.

iii) Concretes and Mortars

The concretes and mortars of the invention comprise the cementitious composition, mineral aggregate and water and have a water/cementitious composition ratio of 0.25 to 0.7:1, preferably 0.4 to 0.5:1, more preferably about 0.45:1.

When the mineral aggregate is composed solely of fine aggregates, the composition is a mortar.

Typically the fine aggregates of the mineral aggregate in a mortar have a particle size of up to 5 mm.

When the mineral aggregate comprises coarse particles, possibly with fine aggregates, the composition is a concrete.

Typically the coarse aggregate of the mineral aggregate in a concrete, has a particle size of 5 to 20 mm.

The fine aggregates of the mineral aggregate are typically sand; the mineral aggregate may also contain fines, for example, fly ash.

The cement and pozzolanic material will typically constitute 250 to 500 kg/m³ of a concrete, and 300 to 700 kg/m³ of a mortar.

Surprisingly it has been found that the cementitious material of the invention provides compressive strength results at least comparable and generally better than are achieved by a control composition not containing the bottom ash, and compositions which contain fly ash in place of the bottom ash.

Thus the cementitious materials of the invention when employed in concretes, provide hardened concretes having a compressive strength which is at least 87% and generally more than 100% of that of a corresponding hardened control in which the pozzolanic material is replaced by cement.

EXAMPLES

The invention is further illustrated by reference to the Examples.

Example 1

Tests were carried out to evaluate and demonstrate the effectiveness of different cementitious materials in concrete performance.

Cementitious Materials

Portland cement (St. Constant Plant)

Dollet Hills fly ash

Dollet Hills bottom ash from wet boiler

Kentucky dry silica fume

Kentucky wet silica fume

The chemical analysis of the materials is presented in Table 1.

Aggregate

Sand

Stone

Preparation of the materials

Dollet Hills bottom ash, a wet bottom boiler ash, was ground to the same fineness (45 $\mu$m) as the Dollet Hills fly ash.

Two blends of ground bottom ash and silica fume were prepared; one with dry silica fume and one with wet silica fume. The blend was 1 part silica fume to 4 parts bottom ash (20%). This blend was used to replace 20%, by weight, of the cement in the concrete mix.

The overall silica fume content is 4%.

Testing Program

Concrete 7 and 28-day strengths were measured. A fixed water cementitious ratio of 0.45 was used and slump was recorded. A water reducer was added but no air entraining agent.

The mix design used was as follows:

| | kg/m³ |
|---|---|
| Cementitious material | 380 |
| Coarse aggregate (5–20 mm) | 1050 |
| Sand | 815 |
| Water | 171 |
| Water reducer 25 × L | 250 ml/100 kg |
| W/cementitious | 0.45. |

Results

The results are presented in Table 2. It can be seen that all cementitious materials are effective. 20% replacement with a blend of dry silica fume and ground bottom ash gave the highest 28-day strength with 22% increase over control. The blend of wet silica fume and bottom ash also performed very well with a 17% increase over control at 28 days. Bottom ash alone produced an 8% increase over control in the 28 day strength, whereas fly ash alone produced a decrease of about 9% over control.

TABLE 1

| | Chemical Analysis | | | |
|---|---|---|---|---|
| | Dollet Hills Fly Ash | Dollet Hills Bottom Ash | Kentucky Dry SF | Kentucky Wet SF |
| $SiO_2$ | 60.4 | 79.8 | 90.2 | 82.8 |
| $Al_2O_3$ | 23.9 | 11.0 | 0.9 | 1.1 |
| $Fe_2O_3$ | 8.4 | 4.6 | 2.1 | 3.6 |
| CaO | 3.6 | 2.5 | 1.8 | 1.5 |
| MgO | 1.2 | 0.8 | 1.9 | 2.7 |
| $Mn_2O_3$ | 0.09 | 0.08 | 0.3 | 2.2 |
| $Na_2O$ | 0.35 | 0.34 | 0.12 | 0.09 |
| $K_2O$ | 1.03 | 0.67 | 0.84 | 0.72 |
| $SO_3$ | 0.3 | 0.05 | 0.6 | 0.3 |
| LOI | 0.2 | 0.3 | 1.4 | 5.2 |
| C | 0.07 | 0.14 | 1.8 | 2.4 |

LOI = loss of ignition

TABLE 2

Concrete Results

|  | Control St-Constant T10 | 20% FA | 20% Bottom ash | 20% Dry SF + bottom ash | 20% Wet SF + bottom ash |
|---|---|---|---|---|---|
| Properties of fresh Concrete | | | | | |
| Slump (mm) | 150 | 200 | 60 | 70 | 40 |
| Air Content (%) | 1.9 | 1.4 | 1.9 | 1.8 | 2.2 |
| Unit Weight (kg/m$^3$) | 2410 | 2420 | 2440 | 2420 | 2425 |
| Properties of hardened concrete | | | | | |
| Compressive strength (MPa) | | | | | |
| 7d | 36.6 | 29.7 | 36.2 | 38.9 | 39.9 |
| 28d | 46.7 | 42.5 | 50.5 | 56.9 | 54.7 |

Example 2

The procedure of Example 1 was followed but employing Bath Plant and St. Constant plant cements (Bath T-10 and St. Constant T-10 ), particulars and results are set out in Tables 3 and 4 below.

Replacement of cement with bottom ash alone produced a drop in compressive strength as compared with the control but a significant increase in slump. It is known, in accordance with Abram's Law that strength of the cement increases as the water content is reduced. Thus the high slump may be lowered to a value similar to that of the control by reducing the water content to increase the compressive strength.

In the case in which bottom ash and dry silica fume replaced a portion of the cement, the 28-day compressive strength was higher than that of the control but the slump was low; increasing the slump by addition of water to a level approaching the control would result in a drop in the strength to a value closer to that of the control.

In the case in which bottom ash and wet silica fume replaced a portion of the cement an improvement in the 28-day strength was obtained for the same slump, as compared with the control.

TABLE 3

20% CEMENT REPLACEMENT

|  | CONTROL | DOLLET HILLS FLY ASH | DOLLET HILLS BOTTOM ASH | KENTUCKY DRY S.F. & BOTTOM ASH | KENTUCKY WET S.F. & BOTTOM ASH |
|---|---|---|---|---|---|
| BATH T-10 | | | | | |
| Properties of Fresh Concrete | | | | | |
| Slump (mm) | 110 | 195 | 140 | 60 | 110 |
| Air Content (%) | 2.2 | 1.7 | 2.2 | 2.2 | 2.2 |
| Unit Weight (kg/m$^3$) | 2405 | 2419 | 2391 | 2405 | 2405 |
| Compressive strength (MPa) | | | | | |
| 7-day | 38.1 | 30.9 | 32.7 | 36.7 | 33.9 |
| 28-day | 50.1 | 43.3 | 44.9 | 54.4 | 51.2 |
| Δ Control - 28-day (%) | — | 86 | 90 | 109 | 102 |

TABLE 4

| | | 20% CEMENT REPLACEMENT | | | |
|---|---|---|---|---|---|
| MATERIALS (kg/m³) | SOURCE/TYPE | CONTROL MIX-1 | FLYASH MIX-2 | BOTTOM ASH MIX-3 | DRY SF + BOTTOM ASH MIX-4A |
| WATER | | 171 | 172 | 172 | 172 |
| CEMENT | ST.CONSTANT T-10 | 380 | 306 | 305 | 305 |
| SAND | ST.GABRIEL (CTS) | 816 | 799 | 804 | 803 |
| STONE | LAGACE (CTS) | 1051 | 1057 | 1054 | 1054 |
| CEMENT ADDITIVES | | | | | |
| FLYASH | DOLLET HILLS | | 77 | | |
| BOTTOM ASH | DOLLET HILLS | | | 76 | 61 |
| SILICA FUME | KENTUCKY (DRY) | | | | |
| | KENTUCKY (WET) | | | | 15 |
| WATER REDUCER | 25XL (Trade Mark) | | | | |
| ml/100 kg | | 250 | 250 | 250 | 250 |
| WATER CEMENT RATIO | | 0.45 | 0.45 | 0.45 | 0.45 |
| PROPERTIES OF FRESH CONCRETE | | | | | |
| SLUMP (mm) | | 100 | 110 | 100 | 80 |
| AIR CONTENT (%) | | 1.8 | 1.8 | 1.8 | 1.8 |
| UNIT WEIGHT (kg/m³) | | 2419 | 2412 | 2412 | 2412 |
| COMPRESSIVE STRENGTH (MPa) | | | | | |
| 7-day | | 36.6 | 34.3 | 32.0 | 40.1 |
| 28-day | | 46.7 | 44.5 | 41.6 | 54.8 |
| Δ Control-28-day (%) | | | 95 | 89 | 117 |

We claim:

1. A cementitious composition for use in concretes and mortars comprising 75 to 85%, by weight, cement and 15 to 25%, by weight, of a pozzolanic material consisting essentially of 75 to 100%, by weight, of a ground bottom ash having a particle size such that 80 to 100% pass a 45 $\mu$m screen, said ground bottom ash being recovered ground agglomerates of residual mineral coal ash from burning of coal in a coal combustion boiler, and 25 to 0%, by weight, of silica fume, said cementitious composition providing a compressive strength in concretes and mortars at least comparable with the compressive strength achieved by said cement, alone or in combination with fly ash, as a cementitious composition.

2. A composition according to claim 1, wherein said pozzolanic material consists of bottom ash formed in a wet bottom coal combustion boiler.

3. A composition according to claim 1, wherein said pozzolanic material consists of bottom ash formed in a dry bottom coal combustion boiler.

4. A composition according to claim 1, wherein said pozzolanic material consists essentially of 75 to 85%, by weight, of said bottom ash and 15 to 25%, by weight, of silica fume, based on the weight of pozzolanic material.

5. A composition according to claim 2, wherein 100% of said ground bottom ash has a particle size of less than 45 $\mu$m.

6. A concrete or mortar composition comprising:
   i) a cementitious composition comprising 75 to 85%, by weight, cement and 15 to 25%, by weight, of a pozzolanic material consisting essentially of 75 to 100%, by weight, of a ground bottom ash having a particle size less than 50 $\mu$m such that 80 to 100% pass a 45 $\mu$m screen, and 25 to 0%, by weight of silica fume,
   ii) mineral aggregate selected from coarse aggregate or fine aggregate, and
   iii) water,
   said concrete or mortar composition having a water/cementitious composition ratio of 0.25:1 to 0.7:1, said ground bottom ash being recovered ground agglomerates of residual mineral coal ash from burning of coal in a coal combustion boiler said cementitious composition providing a compressive strength in said concrete or mortar composition at least comparable with the compressive strength achieve by said cement, alone or in combination with fly ash, as a cementitious composition.

7. A concrete composition according to claim 6, wherein said mineral aggregate comprises coarse aggregate and sand.

8. A concrete composition according to claim 7, wherein said pozzolanic material consists of bottom ash formed in a wet bottom coal combustion boiler.

9. A concrete composition according to claim 7, wherein said pozzolanic material consists of bottom ash formed in a dry bottom coal combustion boiler.

10. A concrete composition according to claim 7, wherein said pozzolanic material consists essentially of 75 to 85%, by weight, of said bottom ash and 15 to 25%, by weight of silica fume, based on the weight of pozzolanic material.

11. A concrete composition according to claim 6, which when hardened has a compressive strength at least 87% of that of a corresponding hardened control composition formed from said cement, said mineral aggregate and said water.

12. A mortar composition according to claim 6, wherein said aggregate is a fine aggregate.

13. A hardened concrete comprising the composition of claim 11.

14. In a cementitious composition comprising a cement in admixture with a pozzolanic material, the improvement wherein said pozzolanic material is a ground bottom ash having a particle size less than 50 μm such that 80 to 100% pass a 45 μm screen, said composition comprising about 20%, by weight, of said around bottom ash.

15. A composition according to claim 4, wherein said bottom ash is formed in a wet bottom coal combustion boiler.

16. A composition according to claim 10, wherein said bottom ash is formed in a wet bottom coal combustion boiler.

17. A composition according to claim 6, having a 7 day compressive strength, as hardened, of 36 to 40 MPa and a 28 day compressive strength of 50.5 to 57 MPa.

* * * * *